US008927936B2

United States Patent
Arndt et al.

(10) Patent No.: US 8,927,936 B2
(45) Date of Patent: Jan. 6, 2015

(54) MULTI-BEAM DETECTOR RETROFITTED FROM SINGLE-BEAM DETECTOR

(71) Applicant: Progress Rail Services Corporation, Albertville, AL (US)

(72) Inventors: Donald J. Arndt, Napolean, MO (US); Mark J. Bartonek, Inchep, MO (US)

(73) Assignee: Progress Rail Services Corp, Albertville, AL (US)

( * ) Notice: Subject to any disclaimer, the term of this patent is extended or adjusted under 35 U.S.C. 154(b) by 82 days.

(21) Appl. No.: 13/719,450

(22) Filed: Dec. 19, 2012

(65) Prior Publication Data

US 2014/0166885 A1    Jun. 19, 2014

(51) Int. Cl.
G01J 5/02     (2006.01)
G02B 26/10    (2006.01)
G01J 5/10     (2006.01)

(52) U.S. Cl.
CPC .. G01J 5/10 (2013.01); G02B 26/10 (2013.01)
USPC ...................................................... 250/349

(58) Field of Classification Search
CPC ..... B61K 9/04; B61K 9/06; G01J 2005/0033; G01J 5/10; B61L 25/04; G02B 26/123
USPC .................... 250/349, 339.04, 342
See application file for complete search history.

(56) References Cited

U.S. PATENT DOCUMENTS

| 3,545,005 | A | * | 12/1970 | Gallagher | 246/169 D |
| 4,659,043 | A | * | 4/1987 | Gallagher | 246/169 A |
| 5,149,025 | A | * | 9/1992 | Utterback et al. | 246/169 A |
| 5,448,072 | A | * | 9/1995 | Gallagher | 250/349 |
| 5,660,470 | A | * | 8/1997 | Mench | 374/121 |
| 5,677,533 | A | * | 10/1997 | Yaktine et al. | 250/342 |
| 6,695,472 | B1 | * | 2/2004 | Nayer | 374/141 |
| 6,872,945 | B2 | * | 3/2005 | Bartonek | 250/339.04 |
| 8,439,315 | B2 | * | 5/2013 | Kilian et al. | 246/167 R |
| 2004/0075570 | A1 | * | 4/2004 | Bartonek | 340/682 |
| 2004/0089808 | A1 | * | 5/2004 | Bartonek | 250/339.04 |
| 2007/0138348 | A1 | * | 6/2007 | Bartonek | 246/169 A |
| 2008/0223630 | A1 | * | 9/2008 | Couture et al. | 180/9.32 |

(Continued)

FOREIGN PATENT DOCUMENTS

EP    1600351    11/2005

OTHER PUBLICATIONS

Author:Erich Eisenbrand, Title:Hot box detection in European railway networks, Date: 2011, Publisher:RTR Special 2011.*

(Continued)

Primary Examiner — Kiho Kim
Assistant Examiner — Taeho Jo
(74) Attorney, Agent, or Firm — Finnegan, Henderson, Farabow, Garrett & Dunner LLP

(57) ABSTRACT

The present disclosure is directed to a method of retrofitting an existing single-beam infrared scanner assembly for detecting the temperature of an object. The method may include removing optics and optoelectronic components contained within an existing housing of the single-beam infrared scanner assembly. The optics and optoelectronic components of the single-beam infrared scanner assembly may be replaced with optics and optoelectronic components for a multi-beam infrared scanner assembly. The replacement optics and optoelectronic components for the multi-beam infrared scanner assembly may be installed in the existing housing of the single-beam infrared scanner assembly.

21 Claims, 4 Drawing Sheets

(56) References Cited

U.S. PATENT DOCUMENTS

| | | | |
|---|---|---|---|
| 2008/0228427 A1* | 9/2008 | Church | 702/135 |
| 2008/0281532 A1* | 11/2008 | Church et al. | 702/40 |
| 2008/0303656 A1* | 12/2008 | Mathews et al. | 340/540 |
| 2009/0095907 A1* | 4/2009 | Harding et al. | 250/338.3 |

OTHER PUBLICATIONS

Author: Progress Rail Service, Title:MicroScanIR Rugged, Compact Scanner Built for Reliability, Publisher: Progress Rail Service.*

Authors:Andreas Schöbel, Manfred Pisek, Johannes Karner, Title:Hot Box Detection Systems as a Part of Automated Train Observation in Austria.*

Author:Erich Eisenbrand, Title:Hot box detection in European railway networks, Date: Mar. 2011, Publisher:RTR Special 2011.*

Progress Rail Service, Title:MicroScanIR Rugged, Compact Scanner Built for Reliability, Publisher: Progress Rail V Service, Date: Feb. 28, 2012, Publisher: Signal & Communication.*

Andreas Sch6bel, Manfred Pisek, Johannes Karner, Title:Hot Box Detection Systems as a Part of Automated Train Observation in Austria, Date: Jan. 2006, Publisher: Eurail Press.de.*

* cited by examiner

MULTI-BEAM DETECTOR RETROFITTED FROM SINGLE-BEAM DETECTOR

TECHNICAL FIELD

The present disclosure relates generally to a multi-beam detector and, more particularly, a multi-beam detector retrofitted from a single-beam detector.

BACKGROUND

Monitoring systems for the railroad industry provide methods and apparatus for automatic determination of the conditions of wheels and bearings on passing trains. Infrared (IR) scanners and associated circuits are available commercially and are used in close proximity to railroad tracks at wayside stations or in housings formed to mount on or replace certain ties. Existing IR scanners use a lens or other optical apparatus to collect radiated infrared energy from the wheels or wheel bearings and focus the collected infrared radiation directly onto an infrared detection device, such as a pyroelectric cell or a focal plane array (FPA) of such cells. The pyroelectric cell(s) produces an output voltage that is proportional to the infrared temperature of the infrared radiation passing through the detector's optics. An increase in the power or intensity of the infrared radiation results in an increase in the voltage or current generated by the detector. Known IR scanners sense infrared radiation radiating from the wheels or wheel bearings within two or more infrared wavelength ranges.

One problem associated with existing monitoring systems is the lack of accuracy in the detection of temperatures of different types and sizes of wheel bearings or other objects or components having inconsistent configurations as they pass an infrared scanner. New methods of monitoring the conditions of components on trains call for accurate identification of trends in the temperature of a component on the train as the component passes successive detectors positioned along the railroad tracks in the direction of train travel. For example, different size and configuration wheel bearings such as "F" type wheel bearings and "K" type wheel bearings have different dimensions from the front edge to the back edge of the bearings, and therefore different relative locations of portions of the wheel bearings such as the grease seal backing ring, which may be expected to run at hotter temperatures than the rest of the bearing.

One attempt to improve the accuracy of detection of a temperature range or a temperature of a wheel or wheel bearing on a train is disclosed in U.S. Pat. No. 6,872,945 of Bartonek that issued on Mar. 29, 2005 (the '945 patent). The '945 patent provides a sensor that senses infrared radiation radiating from a wheel or wheel bearing within two or more different infrared wavelength ranges, and generates signals indicative of an amplitude of the sensed infrared radiation in each of the wavelength ranges. The sensor receives infrared radiation originating from a source or point of origin, and includes an array of a plurality of infrared detection elements. Each of the infrared detection elements is configured to detect a separate and unique wavelength range or frequency band of radiation that does not overlap with any wavelength range of any other element. A peak wavelength range is determined with the greatest amplitude, and this peak wavelength range is indicative of the temperature of the wheel or wheel bearing.

Although the temperature detection system of the '945 patent improves the accuracy of detection of a temperature of a wheel or wheel bearing by detecting peak wavelength ranges that are not affected by external factors such as snow, ice, rain, wind, or sun, it may be less than optimal. In particular, the detection system may focus on a limited area of the passing wheel bearing, and may therefore provide a less than optimal temperature or temperature profile for components such as wheel bearings that often vary in configuration. This inaccuracy in measuring the temperature of some passing wheel bearings also limits the ability to accurately identify trends in the temperatures that may be useful in predicting potential problems.

The system and method of the present disclosure solves one or more problems set forth above and/or other problems in the art.

SUMMARY

In one aspect, the present disclosure is directed to a method of retrofitting an existing single-beam infrared scanner assembly for detecting the temperature of an object. The method may include removing optics and optoelectronic components contained within an existing housing of the single-beam infrared scanner assembly. The method may also include installing replacement optics and optoelectronic components for the multi-beam infrared scanner assembly in the existing housing of the single-beam infrared scanner assembly. The method may further include interposing the optics for the multi-beam infrared scanner assembly in a path of infrared radiation received through an opening in the existing housing.

In another aspect of the disclosure, a retrofit multi-beam infrared scanner assembly is provided. The retrofit multi-beam infrared scanner assembly may include an existing housing from a single-beam infrared scanner configured for installation in the vicinity of a train track. The retrofit multi-beam infrared scanner assembly may include a multi-beam infrared lens holder installed in the existing housing to replace an existing single-beam infrared lens holder and being configured to support a multi-beam infrared lens. The retrofit scanning assembly may also include the multi-beam infrared lens installed in the multi-beam infrared lens holder to replace the existing single-beam infrared lens. A multi-beam infrared detector may be installed in the existing housing to replace an existing single-beam infrared detector, and may be configured to receive a plurality of bands of infrared radiation from an object being measured. A processor may be provided with the retrofit multi-beam infrared scanner assembly that is configured to receive a plurality of signals from the multi-beam infrared detector and process those signals into a single, composite output.

DETAILED DESCRIPTION

Figure 1:
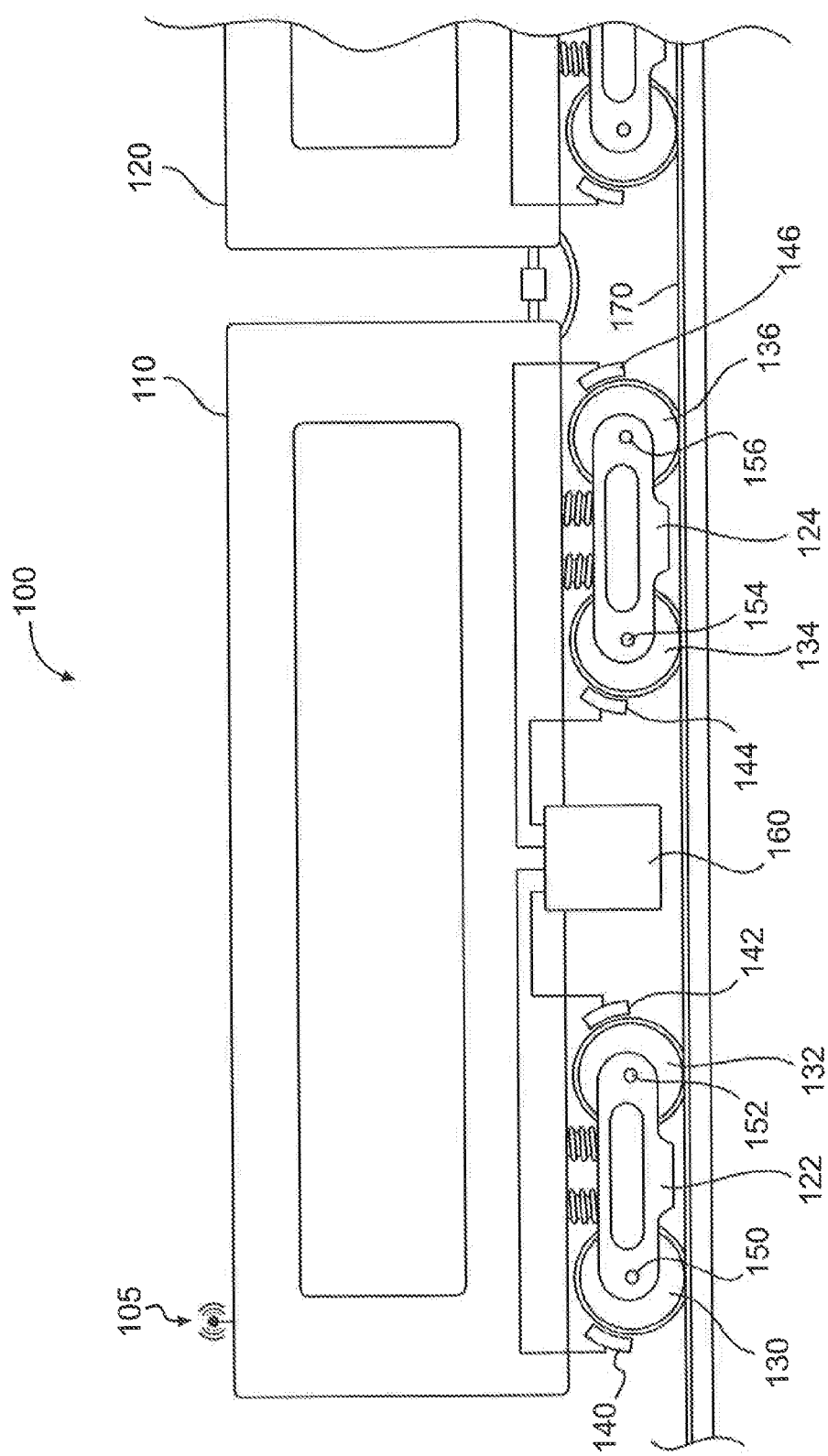
FIG. 1 is a diagrammatic illustration of an exemplary disclosed train.

FIG. 1 illustrates a portion of a train 100 including one or more cars 110, 120. Each car, such as shown for car 110, may include a plurality of trucks, such as trucks 122 and 124. A car may have as many as ten or more trucks, although more typically the number of trucks is two per car. Each truck 122, 124 may include two or more axles, with wheel bearings 150, 152 shown at one end of each of the axles on truck 122, and wheel bearings 154, 156 shown at one end of each of the axles on truck 124.

In various implementations of this disclosure, a plurality of multi-beam infrared scanners may be positioned along, in between, or in close proximity to rails 170 of a train track along which train 100 travels. The multi-beam infrared scanners may be configured to receive and process multiple beams of infrared radiation emitted from different portions of a passing wheel bearing or other object or component of interest. Each multi-beam infrared scanner may include an autonomous processor configured to receive a plurality of signals indicative of the intensity and/or magnitude of each of the beams of infrared radiation, and process the plurality of signals in order to derive a composite signal indicative of a temperature of a passing component such as wheel bearings 154, 156. The processor associated with each multi-beam infrared scanner, or included as part of each multi-beam infrared scanner, may be configured to distinguish signals that are indicative of temperatures on certain portions of the passing wheel bearing. For example, the processor may be configured to give different weights to different signals indicative of temperatures of different portions of the wheel bearing. The multi-beam infrared scanners may be configured and positioned to receive multiple beams of infrared radiation emitted from different portions of various wheel bearings that may have different dimensions and/or configurations on different cars. The processor may therefore be configured to determine an accurate composite temperature for different types of passing wheel bearings. The accuracy in detection of temperatures of the wheel bearings may also enable accurate monitoring of trends in the temperatures of the wheel bearings.

In various implementations, each truck 122, 124 with two or more axles, with wheel bearings 150, 152, 154, 156 located at the ends of the axles, and two wheels 130, 132, 134, 136 per axle, may be associated with a single brake valve 160. Wheels 130, 132, 134, 136 are each shown at one end of their respective axles, and may be paired with matching wheels (not shown) at the opposite ends of their respective axles. In alternative implementations, each brake valve 160 may be associated with more than one truck 122, 124. Braking systems associated with each brake valve 160 may operate, (and may fail) independently of one another. Various components may wear out from continued use, and worn components may result in generation of excessive heat, which in turn may lead to failure of the components or potentially unsafe conditions. Therefore, various implementations of the present disclosure may monitor wheel temperatures, or wheel bearing temperatures, as discussed in detail below.

Figure 2:
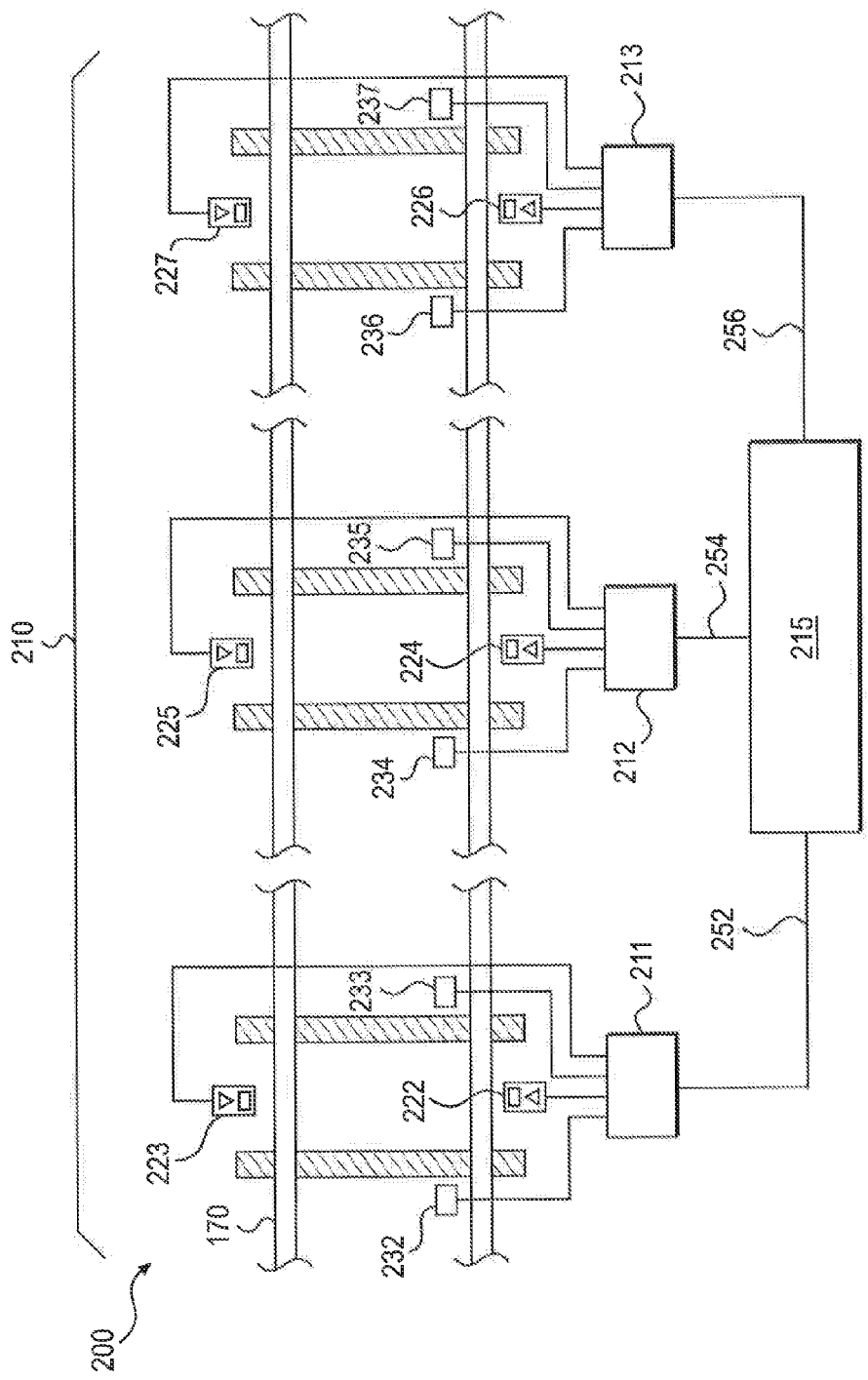
FIG. 2 is a schematic illustration of an exemplary disclosed temperature detecting system that may be used with the train of FIG. 1.

FIG. 2 illustrates an example implementation of the disclosure directed to a temperature detecting system 200 for detecting the temperature of components including wheels 130, 132, 134, 136, and wheel bearings 150, 152, 154, 156 on train cars 110, 120 (shown in FIG. 1) moving along rails 170 of a train track. Wayside temperature detectors 211, 212, 213 may be positioned along rails 170 to automatically sense the temperature of components such as wheels 130, 132, 134, 136 or wheel bearings 150, 152, 154, 156 of a passing train. Signals output from temperature detectors 211, 212, 213 may be processed to enable an alarm when the wheel or wheel bearing temperatures become too great for continued safe operation, or when the sensed temperatures may be exhibiting a magnitude or trend in magnitudes that may assist in determining when to schedule preventative maintenance for avoidance of possible failures or unsafe conditions.

Temperature detectors 211, 212, 213 in FIG. 2 may be positioned and configured to detect temperatures of the wheel bearings or other components of a passing train. Temperature detectors 211, 212, and 213 may include temperature sensors 222-227, which are configured to convert sensed infrared (IR) radiation energy produced by a component such as a passing train wheel or wheel bearing to an electrical signal that is proportional to the amount of heat output by the wheel or wheel bearing relative to ambient temperature. Temperature detectors 211, 212, 213 may also include temperature sensors 222-227 that detect photons emitted from an object being measured. A photodetector may be a semiconductor photodiode device that generates electrical current or electron excitation when a light source or other source of radiant energy projects onto its surface, or when light or other radiant energy enters a diode semiconductor device, such as GaAs or InGaAs.

Temperature detectors 211, 212, 213, and temperature sensors 222-227 may be located in different positions relative to rails 170. Temperature detectors 211, 212, 213, and temperature sensors 222-227 may be located in positions adjacent rails 170 and in between rails 170. They may also be located in housings configured to replace select ties provided to support rails 170 (sometimes referred to as "sleeper ties"). Other locations for temperature detectors 211, 212, 213, and temperature sensors 222-227, may include positions adjacent rails 170 and to the outside of rails 170, at angles looking up from ground level, at angles looking in a horizontal direction from an elevated position adjacent rails 170 and at approximately the height of wheel bearings 150, 152, 154, 156, and at angles looking down toward ground level from an elevated position adjacent rails 170. Temperature sensors 222-227 are located relative to the component that is being measured such that the detection zone for each sensor encompasses a location or locations on the component from which infrared radiation may be emitted.

As shown in FIG. 2, at least a first temperature sensor 222, and a second temperature sensor 223, may be disposed on opposite sides of rails 170 in order to be able to detect the temperatures of wheels or wheel bearings on both sides of a passing train car. Temperature sensors 224 and 225 associated with temperature detector 212, may be positioned on opposite sides of rails 170 at the same location, or at predetermined spacing, and at a predetermined spaced interval along rails 170 from temperature detector 211. Optional additional pairs of temperature sensors associated with additional temperature detectors, such as temperature sensors 226 and 227 associated with temperature detector 213, may also be disposed at predetermined spaced intervals further along rails 170 in a direction of train travel along rails 170. In some implementations, temperature sensors 222-227 may each be positioned at locations approximately 7 to 7.5 inches out from an inside edge of rails 170, and angled to look, up at approximately a 45 degree angle so that a zone of detection for each temperature sensor encompasses all or a portion of a passing wheel bearing.

The spaced pairs of temperature sensors may be included in a predesignated detection area 210 along rails 170. Multiple detection areas similar to detection area 210 may be spaced along rails 170, with each detection area including two or more spaced pairs of temperature sensors. The detection areas may be located along stretches of train track over varying terrains. The pairs of temperature sensors 222 and 223, 224 and 225, and 226 and 227 placed along opposite sides of rails 170 may produce signals indicative of the temperatures for each wheel or wheel bearing on a per axle basis, and may provide those signals to associated temperature detectors 211, 212, 213, respectively. Each temperature detector 211, 212, 213 may also include associated wheel position sensors 232 and 233, 234 and 235, and 236 and 237, respectively.

As a train car wheel passes each temperature detector 211, 212, 213, the associated pairs of wheel position sensors 232-235 may provide signals to the associated temperature detectors 211, 212, 213. Each associated temperature detector 211, 212, 213 may use the signals from wheel position sensors 232-235 in defining a window when signals from associated temperature sensors 222-227 may be received and converted into temperatures of passing wheels 130, 132, 134, 136 or wheel bearings 150, 152, 154, 156. Each of temperature detectors 211, 212, and 213 may be positioned at wayside stations along rails 170, and may be communicatively coupled with a processor 215 of testing system 200. Temperature signals 252, 254, 256 may be communicated from temperature detectors 211, 212, 213, respectively, to processor 215. Alternatively, each temperature detector 211, 212, 213 may include an autonomous processor configured to perform various functions on the data received from temperature sensors 222-227.

In at least some implementations, each temperature sensor 222-227 may be provided as a multi-beam infrared scanner configured to receive and process multiple beams of infrared radiation emitted from different portions of a passing wheel bearing or other object of interest. Each multi-beam infrared scanner may be associated with, or may include an autonomous processor configured to receive a plurality of signals indicative of the intensity and/or magnitude of each of the beams of infrared radiation, and process the plurality of signals in order to derive a composite signal indicative of a temperature of the wheel bearing. The processor associated with each temperature sensor, or included as part of each temperature sensor, may be configured to distinguish signals that are indicative of temperatures on certain portions of the passing wheel bearing. For example, the processor may be configured to give different weights to different signals indicative of temperatures of different portions of the wheel bearing. In some implementations it may be desirable to give less weight to signals indicative of the temperature of the grease seal portion of a wheel bearing, which may be known to run generally hotter than other portions of the wheel bearing. The processor may therefore be configured to determine a composite temperature of a passing wheel bearing that has been learned to be of interest in accurately monitoring trends in the temperatures of the wheel bearings.

A multi-beam infrared scanner may cover a larger scan area of the object or component being measured than a single-beam detector, in addition to providing more comprehensive spectral information about the object or component. The multi-beam infrared scanner may therefore provide more useful information on properties of the object, such as providing more accurate detection of wheel bearing temperatures and temperature profiles across different types and sizes of wheel bearings. The term "multi-beam" as used herein may refer to a plurality of different beams of emitted infrared radiation received from spatially separated locations on an object being measured, or a plurality of different wavelength bands of emitted infrared radiation. The spectral ranges that a multi-beam infrared scanner may be able to detect include the visible band, the near infrared band (VIS/NIR), the short wave infrared (SWIR) band, the medium wave infrared (MWIR) band, and the long wave infrared (LWIR) band.

An infrared detector element used in a multi-beam infrared scanner may be a transducer that converts infrared energy into a measurable form. The detected energy can be transformed into imagery showing the differences between objects or portions of an object that might otherwise be obscured. Objects or portions of objects with differing levels of infrared emissions are discernible in an image created using a multi-beam infrared scanner. Alternatively, or in addition, the detected energy may be used to generate an alarm or other signal if a threshold is met or exceeded.

Figure 3:
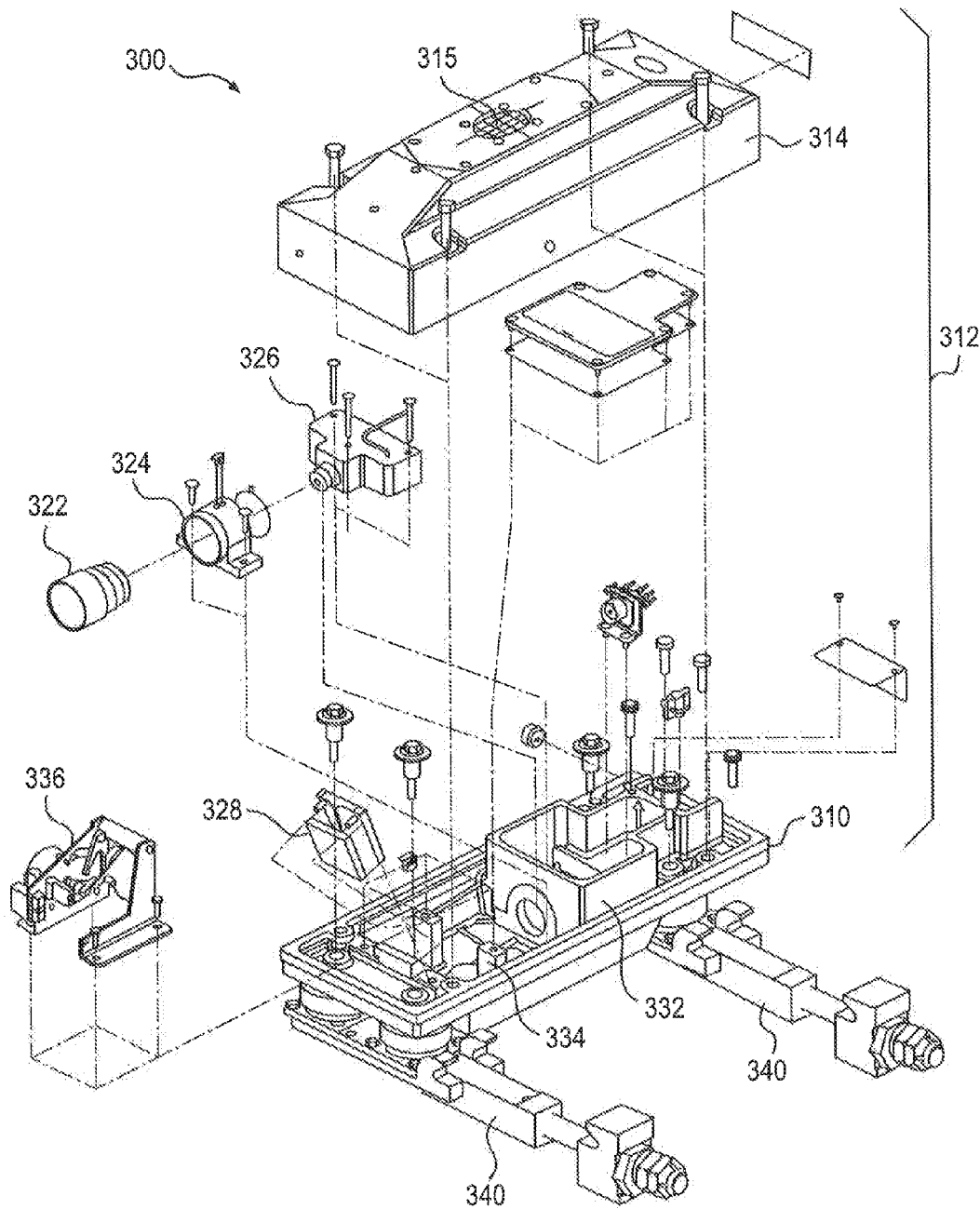
FIG. 3 is a diagrammatic illustration of an exemplary retrofitted multi-beam infrared scanner assembly that may be used with the temperature detecting system of FIG. 2.

Temperature sensors 222-227 may be provided as multi-beam infrared scanner assemblies, such as retrofitted multi-beam infrared scanner assembly 300, illustrated in FIG. 3. Although FIG. 2 shows temperature sensors 222-227 as separate from temperature detectors 211, 212, 213 for illustrative purposes, one of ordinary skill in the art will recognize that the temperature detecting element or elements that receive infrared radiation emitted from an object being measured may be provided within a scanner assembly that is positioned to have a direct line of sight to the particular component being measured on a passing train. In various alternative implementations, the detection elements that actually receive the infrared radiation from a component and convert that radiation into an electrical signal may also be positioned remotely from the optics or optoelectronic components positioned in the line of sight of the infrared radiation, and may receive the infrared radiation through fiber-optics or other means.

Multi-beam infrared scanner assembly 300 may provide the advantage of being configured to scan a larger scan area than a single-beam infrared scanner assembly. Multi-beam infrared scanner assembly 300 may also provide the advantage of being configured to simultaneously detect a plurality of different wavelength bands of infrared radiation emitted from an object being measured. Alternatively or additionally, multi-beam infrared scanner assembly 300 may detect a plurality of spatially separated or superimposed beams of infrared radiation emitted from different portions or areas on a measured object. In accordance with various implementations of this disclosure, multi beam infrared seamier assembly 300 may be retrofitted from an existing single-beam infrared scanner assembly. A significant savings in the costs associated with replacing existing single-beam infrared scanner assemblies with multi-beam infrared scanner assemblies 300 may be realized by reusing at least the housing from a single-beam infrared scanner for producing a retrofit multi-beam infrared scanner assembly 300.

Many existing "Hot Box Detectors" (HBDs) and "Hot Wheel Detectors" (HWDs) provided as temperature detectors for sensing temperatures of wheels and wheel bearings on a moving train, are provided as single-beam infrared scanner assemblies. A single-beam infrared scanner assembly may enable detection of an abnormally hot portion of the component being measured. When the components expected to be measured by the single-beam infrared scanner assembly are all of the same or similar construction or configuration, the single-beam infrared scanner assembly may provide a zone of detection that covers a relatively small area on the component being measured. The area on the component that is selected for measurement by the single-beam infrared scanner assembly may, for example, be an area that is known to run hot when the component is potentially about to fail.

There may be a variety of reasons for providing a multi-beam infrared scanner assembly in place of a single-beam infrared scanner assembly at a temperature monitoring station. The different types and configurations of components on train cars for which temperature measurements may be obtained, may result in the areas of potential interest on some of the components falling outside of the detection zone for a single-beam infrared scanner assembly. Accordingly, a multi-beam infrared scanner assembly with a larger detection zone than a single-beam infrared scanner assembly may provide advantages by detecting temperatures of infrared radiation emitted over a larger area of a component, and over a larger spectral range of infrared radiation. Multi-beam infrared scanner assembly 300 may allow for a more accurate determination of any trends in the temperature of the component as it passes by multi-beam infrared scanner assemblies 300 at successive monitoring stations along rails 170 a train track. Accurate identification of trends in changes of temperature of a component or portions of a component may allow for an earlier detection of potential alarm scenarios, and with fewer false alarms being generated.

As shown in FIG. 3, a retrofit multi-beam infrared scanner assembly 300 may include a housing 312 with a base 310 and a cover 314. Housing 312 may be formed using different techniques including, but not limited to, injection molding and casting. Base 310 may be provided with various ribs 332, protrusions, bosses 334, and compartments defined by ribs 332 configured for supporting various optical and optoelectronic components. Cover 314 may also be formed using similar manufacturing techniques, and may include an opening 315 through which infrared radiation may be received from objects being measured by multi-beam infrared scanner assembly 300. In accordance with various implementations of this disclosure, retrofit multi-beam infrared scanner assembly 300 may be produced at a significant savings from a completely new multi-beam infrared scanner assembly by reusing a housing 312 from an existing single-beam infrared scanner assembly. Optical and optoelectronic elements including a single-beam infrared detector, associated electronics and optoelectronics, a single-beam infrared lens, a single-beam infrared lens holder, a mirror assembly, a shutter assembly, connecting cables, and other elements specific to the single-beam infrared scanner assembly may be removed from housing 312 as part of retrofitting the single-beam infrared scanner assembly into multi-beam infrared scanner assembly 300.

Various optical elements including a focusing element such as a lens, a reflecting element such as a mirror, a dispersive element such as a prism, and a control element such as a shutter assembly may be mounted within housing 312. A multi-beam infrared lens 322 may be mounted in a multi-beam infrared lens holder 324, and positioned within housing 312. Multi-beam infrared lens 322 may be positioned to couple infrared radiation that enters housing 312 through opening 315 in cover 314 along an optical path within housing 312 to a multi-beam infrared detector 326. A mirror assembly 328 and shutter assembly 336 may also be provided in housing 312 in the optical path of infrared radiation entering housing 312. Mirror assembly 328, multi-beam infrared lens 322, and shutter assembly 336 may be designed and configured to fit within housing 312 in place of optical and optoelectronic elements for a single-beam infrared detector. Multi-beam infrared detector 326 may include a focal plane array (FPA) of a plurality of detection elements arranged in rows and columns of pixels over an area large enough to receive multiple beams of infrared radiation.

In one aspect of this disclosure, multi-beam infrared detector 326 may include a plurality of detection elements selected from a variety of different technological types of infrared sensors having different characteristics or operating principles. The types of infrared sensors may include sensors that are configured to detect thermal energy being emitted by an object being measured, and sensors configured to detect photons being emitted by the object being measured. Such types of sensors may include, but are not limited to, photovoltaic sensors, piezoelectric sensors, pyroelectric sensors, thermopile sensors, semiconductor infrared detectors made from mercury cadmium telluride (HgCdTe) (sometimes referred to as MerCaT detectors), semiconductor infrared detectors made from indium antimonide (InSb), semiconductor infrared detectors made from mercury zinc telluride (HgZnTe), semiconductor infrared detectors made from III-V semiconductor materials such as GaAs and AlGaAs, silicon-based bolometers, photon-counting superconducting tunnel junction (STJ) arrays, quantum well infrared photodetectors (QWIP), and quantum dot infrared photodetectors (QDIP), based on either a colloidal or type-II superlattice structure.

Housing 312 of retrofit multi-beam infrared scanner assembly 300 may also be provided with mounting members 340 configured to readily clamp on to rails 170. In some implementations, other mounting hardware may also be provided and configured to position retrofit multi-beam infrared scanner assembly 300 with an unobstructed vantage point for measuring temperatures of a component such as a wheel or wheel bearing on train 100 moving along rails 170.

A processor (not shown) may also be provided, either as part of or separate from multi-beam infrared scanner assembly 300. The processor may be a special purpose computer adapted specifically for spectral processing of infrared radiation. The processor may be integrated in firmware, software, integrated circuitry such as custom application specific integrated circuits (ASIC), or some combination thereof. The processor may be configured to receive a plurality of signals from a plurality of detecting elements that may make up multi-beam infrared detector 326, and process the plurality of signals to produce a single composite output signal indicative of a temperature of the component being measured. The processor associated with each multi-beam infrared scanner assembly 300 may be provided at each temperature detector 211, 212, 213, as part of processor 215 for testing system 200, or as one or more processors located at wayside stations, remotely at a dispatch station, on train 100, or at one or more other locations communicatively coupled to multi-beam infrared scanner assemblies 300. The processor may also be configured to provide an alarm or other control instructions based on temperatures detected by multi-beam infrared scanner assemblies 300. Each processor may also be configured to receive multiple signals from multi-beam infrared detector 326, and process the multiple signals by giving different weights to different signals associated with different portions of the object being measured. Each processor may also be connected to one or more detection elements or a FPA of detection elements via one or more communication links including, but not limited to, conductors, fiberoptic cables, acoustic links, electromagnetic links, or any combination thereof.

Figure 4:
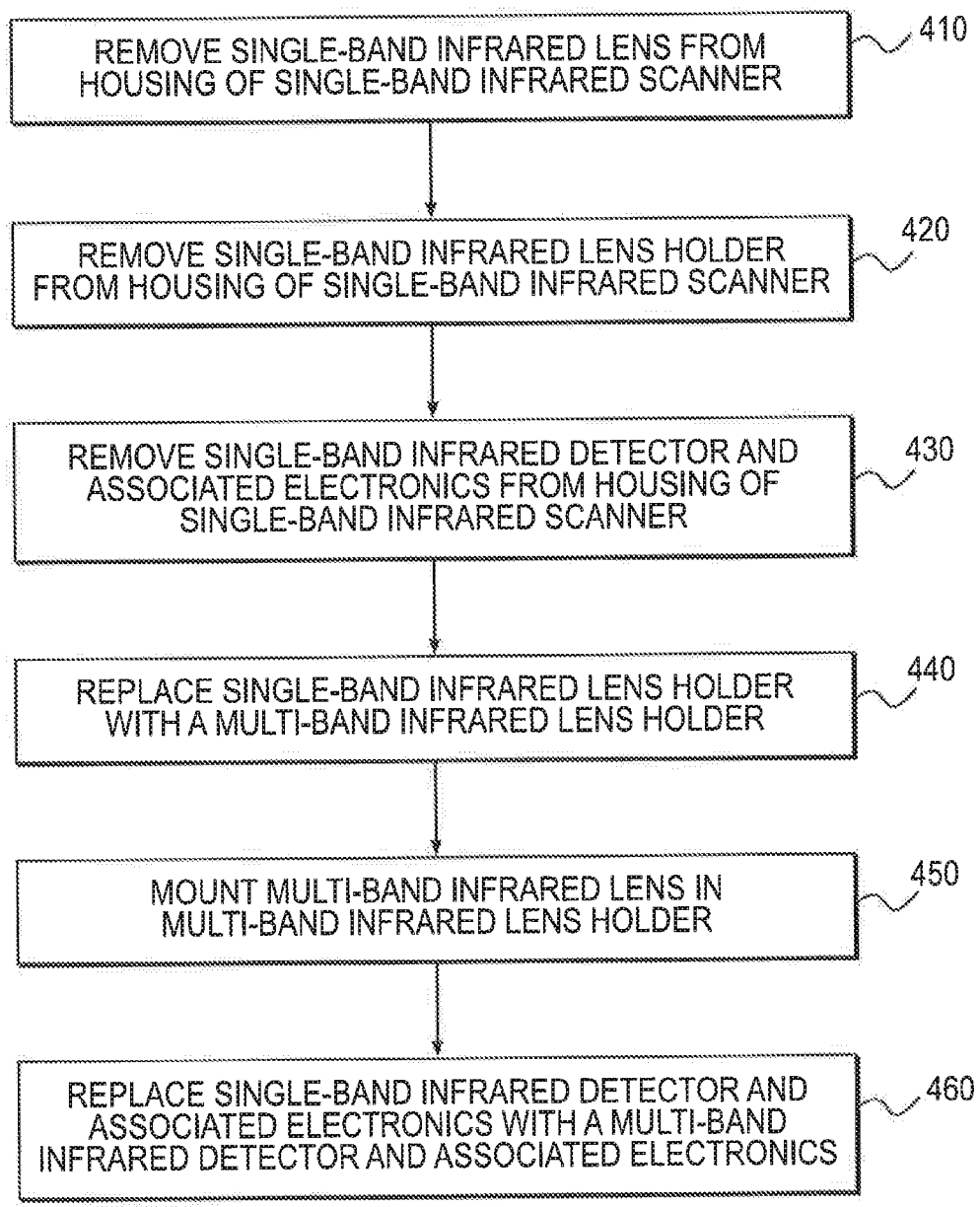
FIG. 4 is a flowchart depicting an exemplary disclosed method that may be performed by the system of FIG. 2.

FIG. 4 is a flowchart depicting an exemplary disclosed method that may be performed to produce retrofit multi-beam infrared scanner assembly 300 for use in testing system 200 of FIG. 2. FIG. 4 will be discussed in more detail below to further illustrate the disclosed concepts.

Industrial Applicability

The disclosed method and system may provide a less expensive way of replacing existing single-beam infrared scanner assemblies for measuring the temperatures of components on a passing train than providing entirely new multi-beam infrared scanner assemblies. Retrofitted multi-beam infrared scanner assemblies 300 produced in accordance with various implementations of this disclosure may provide for increased accuracy in the detection of temperatures and temperature profiles of various components on a passing train. The cost savings provided by retrofitting existing single-beam infrared scanner assemblies may enable widespread adaptation of monitoring stations along rails 170 to include retrofitted multi-beam infrared scanner assemblies 300. Increased accuracy in the detection of temperatures and temperature profiles of various components on passing train 100 allows for identification of trends in the temperatures of the components not previously observable. Identification of these trends in the temperature of a particular component at successive positions along the direction of travel of train 100 may allow for earlier identification of potential problems and the ability to correct potential problems before they can lead to safety or costly maintenance issues.

As shown in FIG. 4, retrofit multi-beam infrared scanner assembly 300 may be assembled using existing housing 312 of an existing single-beam infrared scanner assembly. At step 410, a single-beam infrared lens may be removed from housing 312 of a single-beam infrared scanner assembly. At step 420, a single-beam infrared lens holder that had been supporting the single-beam infrared lens may also be removed from housing 312. At step 430, a single-beam infrared detector and associated electronics may be removed from housing 312.

At step 440, the single-beam infrared lens holder from the single-beam infrared scanner assembly may be replaced with multi-beam infrared lens holder 324 in existing housing 312. At step 450, multi-beam infrared lens 322 may be mounted in multi-beam infrared lens holder 324 in existing housing 312. At step 460, multi-beam infrared detector 326 and associated electronics may be installed in existing housing 312 to replace the single-beam infrared detector and associated electronics that have been removed.

Various optical elements, such as mirror assembly 328, shutter assembly 336, and multi-beam infrared lens 322 may be adjustable with respect to an angle of incidence between each of their optical surfaces and incident light that may be projected onto each optical surface. Such an angular adjustment may be used to control the wavelength range, or spectral bandpass that is presented to multi-beam infrared detector 326.

Mirror assembly 328, shutter assembly 336, and multi-beam infrared lens 322 may be interposed in a path of the infrared radiation received by retrofit multi-beam infrared scanner assembly 300. These various optical elements may couple the infrared radiation entering through opening 315 in cover 314 to various optoelectronic elements including multi-beam infrared detector 326. Opening 315 in cover 314 may be enlarged or reconfigured from the opening provided through cover 314 of existing housing 312 from a single-beam infrared scanner assembly in order to allow for the passage of infrared radiation from a larger area of the object being scanned. Multi-beam infrared detector 326 may be provided with a plurality of detection elements arranged to encompass an area of incident infrared radiation received through opening 315. The incident infrared radiation may be projected onto more than one row of pixels provided in a focal plane array (FPA) of detection elements provided as part of multi-beam infrared detector 326. Multi-beam infrared detector 326 may then provide an output, which may be subsequently used to determine the infrared spectral information of the component or object being measured. The output from multi-beam infrared detector 326 may also be used to trigger an alarm or initiate other control action based on a comparison between the output and a threshold value.

It will be apparent to those skilled in the art that various modifications and variations can be made to the disclosed temperature detecting system with multi-beam infrared scanner assembly 300 without departing from the scope of the disclosure. Other embodiments or implementations of the temperature detecting system and retrofit multi-beam infrared scanner assembly 300 will be apparent to those skilled in the art from consideration of the specification and practice of the system disclosed herein. It is intended that the specification and examples be considered as exemplary only, with a true scope of the disclosure being indicated by the following claims and their equivalents.

What is claimed is:

1. A method of retrofitting an existing single-beam infrared scanner assembly for detecting the temperature of an object, the method comprising:
    removing optics and optoelectronic components contained within an existing housing of the single-beam infrared scanner assembly;
    configuring replacement optics and optoelectronic components for a multi-beam infrared scanner assembly to fit in the existing housing of the single-beam infrared scanner assembly;
    installing the replacement optics and optoelectronic components in the existing housing; and
    positioning the optics for the multi-beam infrared scanner assembly in a path of infrared radiation received through a pre-existing opening in the existing housing.

2. The method of claim 1, wherein removing optics and optoelectronic components includes removing a single-beam infrared lens from the existing housing of the single-beam infrared scanner assembly.

3. The method of claim 2, further including removing a single-beam infrared lens holder for supporting the single-beam infrared lens in the existing housing of the single-beam infrared scanner assembly.

4. The method of claim 3, wherein removing optics and optoelectronic components includes removing a mirror assembly from the existing housing of the single-beam infrared scanner assembly.

5. The method of claim 4, wherein removing optics and optoelectronic components includes removing a shutter assembly from the existing housing of the single-beam infrared scanner assembly.

6. The method of claim 1, wherein removing optics and optoelectronic components includes removing a single-beam infrared detector and associated electronics from the existing housing of the single-beam infrared scanner assembly.

7. The method of claim 1, wherein replacing the optics and optoelectronic components of the single-beam infrared scanner assembly includes replacing a single-beam infrared lens and a single-beam infrared lens holder with a multi-beam infrared lens and a multi-beam infrared lens holder.

8. The method of claim 1, wherein replacing the optics and optoelectronic components of the single-beam infrared scanner assembly includes replacing a single-beam infrared detector and associated electronics with a multi-beam infrared detector and associated electronics.

9. A retrofit multi-beam infrared scanner assembly comprising:
    a housing from a single-beam infrared scanner assembly configured for installation in the vicinity of an object for which a temperature is being measured; and
    a multi-beam optical element configured to fit within said housing in place of a single-beam optical element, the multi-beam optical element further being configured for placement within said housing in an optical path of a plurality of different wavelength bands of infrared radiation emitted from the object.

10. The retrofit multi-beam infrared scanner assembly of claim 9, further including a multi-beam optoelectronic element mounted within said housing in place of a single-beam optoelectronic element, the multi-beam optoelectronic element being configured to receive the plurality of different wavelength bands of infrared radiation emitted from the object.

11. The retrofit multi-beam infrared scanner assembly of claim 10, wherein the multi-beam optoelectronic element includes a multi-beam infrared detector.

12. The retrofit multi-beam infrared scanner assembly of claim 11, wherein the multi-beam infrared detector includes a focal plane array of detection elements.

13. The retrofit multi-beam infrared scanner assembly of claim 12, wherein the detection elements include infrared sensors configured to detect thermal energy being emitted from the object.

14. The retrofit multi-beam infrared scanner assembly of claim 10, further including a processor configured to receive a plurality of signals from said multi-beam optoelectronic element and process the plurality of signals into a single output indicative of a temperature of the object.

15. A retrofit multi-beam infrared scanner assembly comprising:
a housing from a single-beam infrared scanner assembly configured for installation in the vicinity of an object for which a temperature is being measured; and
a multi-beam optical element configured to fit within said housing in place of a single-beam optical element, the multi-beam optical element further being configured for placement within said housing in an optical path of a plurality of spatially separated beams of infrared radiation emitted from different portions or areas on the object.

16. The retrofit multi-beam infrared scanner assembly of claim 15, further including a multi-beam optoelectronic element mounted within said housing in place of a single-beam optoelectronic element, the multi-beam optoelectronic element being configured to receive the spatially separated beams of infrared radiation emitted from different portions or areas on the object.

17. The retrofit multi-beam infrared scanner assembly of claim 16, wherein the multi-beam optoelectronic element includes a multi-beam infrared detector.

18. The retrofit multi-beam infrared scanner assembly of claim 17, wherein the multi-beam infrared detector includes a focal plane array of detection elements.

19. The retrofit multi-beam infrared scanner assembly of claim 18, wherein the detection elements include infrared sensors configured to detect photons being emitted from the object.

20. The retrofit multi-beam infrared scanner assembly of claim 16, further including a processor configured to receive a plurality of signals from said multi-beam optoelectronic element and process the plurality of signals into a single output indicative of a temperature of the object.

21. A retrofit multi-beam infrared scanner assembly comprising:
a housing from a single-beam infrared scanner assembly configured for installation in the vicinity of an object for which a temperature is being measured;
a multi-beam optical element mounted within said housing in place of a single-beam optical element, the multi-beam optical element being configured for placement in an optical path of a plurality of spatially separated beams of infrared radiation emitted from different portions or areas on the object, the multi-beam optical element further being configured to fit within said housing in place of the single-beam optical element;
a multi-beam infrared detector mounted within said housing in place of a single-beam infrared detector, the multi-beam infrared detector being configured as a focal plane array of detection elements, the multi-beam infrared detector further being configured to fit within said housing in place of the single-beam infrared detector; and
a processor configured to receive a plurality of signals from said multi-beam infrared detector and process the plurality of signals into a single output indicative of a temperature of the object.

* * * * *

UNITED STATES PATENT AND TRADEMARK OFFICE
CERTIFICATE OF CORRECTION

PATENT NO. : 8,927,936 B2
APPLICATION NO. : 13/719450
DATED : January 6, 2015
INVENTOR(S) : Arndt et al.

It is certified that error appears in the above-identified patent and that said Letters Patent is hereby corrected as shown below:

Title Page, Column 1, Item 72 (Inventors), line 1, delete "Napolean," and insert -- Napoleon, --.

Page 2, Column 2, References Cited (Other Publications), line 9, delete "Andreas Sch6bel," and insert -- Andreas Schobel, --.

In the specification

Column 2, line 55, delete "FIG. 1; and" and insert -- FIG. 1; --.

Column 2, line 59, delete "flowchartdepicting" and insert -- flowchart depicting --.

Column 6, line 35, delete "seamier" and insert -- scanner --.

Column 8, line 55, delete "Industrial Applicability" and insert -- INDUSTRIAL APPLICABILITY --.

Signed and Sealed this
Twenty-fourth Day of November, 2015

Michelle K. Lee
*Director of the United States Patent and Trademark Office*